US008180732B2

(12) United States Patent
Krabel et al.

(10) Patent No.: US 8,180,732 B2
(45) Date of Patent: May 15, 2012

(54) DISTRIBUTING DATA IN MASTER DATA MANAGEMENT SYSTEMS

(75) Inventors: Markus Krabel, Oftersheim (DE); Wolfgang Kalthoff, Bad Schonborn (DE); Frank Rohloff, Sandhausen (DE)

(73) Assignee: SAP AG, Walldorf (DE)

( * ) Notice: Subject to any disclaimer, the term of this patent is extended or adjusted under 35 U.S.C. 154(b) by 973 days.

(21) Appl. No.: 10/367,605

(22) Filed: Feb. 13, 2003

(65) Prior Publication Data
US 2004/0103182 A1 May 27, 2004

Related U.S. Application Data

(60) Provisional application No. 60/429,688, filed on Nov. 27, 2002.

(51) Int. Cl.
G06F 7/00 (2006.01)
G06F 15/16 (2006.01)

(52) U.S. Cl. ........ 707/628; 707/636; 707/637; 707/646; 707/647; 709/217; 709/218; 709/219

(58) Field of Classification Search .......... 707/628–631, 707/636, 637, 646, 647, 200, 201, 103, 10; 709/217–219, 238, 248
See application file for complete search history.

(56) References Cited

U.S. PATENT DOCUMENTS

| 4,459,663 A | 7/1984 | Dye |
| 5,099,431 A | 3/1992 | Natarajan |
| 5,182,705 A | 1/1993 | Barr et al. |
| 5,191,534 A | 3/1993 | Orr et al. |
| 5,311,424 A | 5/1994 | Mukherjee et al. |
| 5,335,346 A | 8/1994 | Fabbio |
| 5,418,945 A | 5/1995 | Carter et al. |
| 5,442,782 A | 8/1995 | Malatesta et al. |
| 5,623,653 A * | 4/1997 | Matsuno et al. ............... 707/200 |
| 5,655,085 A | 8/1997 | Ryan et al. |
| 5,694,598 A | 12/1997 | Durand et al. |
| 5,703,938 A | 12/1997 | Lucas et al. |

(Continued)

FOREIGN PATENT DOCUMENTS
CA 2391829 6/2001

(Continued)

OTHER PUBLICATIONS

Chan and Suwanda, "Designing Multinational Online Stores: Challenges, Implementation Techniques and Experience", *IBM Centre for Advanced Studies Conference: Proceedings of the 2000 conference of the Centre for Advanced Studies on Collaborative research*, Mississauga, Ontario, Canada, 2000, pp. 1-14.

(Continued)

*Primary Examiner* — Gregory Todd
(74) *Attorney, Agent, or Firm* — Schwegman, Lundberg & Woessner, P.A.

(57) ABSTRACT

Methods and apparatus, including computer program products, for distributing data in a data management system. The technique includes identifying one or more objects in a central data store for distribution, determining if a routing exists for at least one object of the one or more objects, and distributing the at least one object to one or more target systems specified by the routing. The one or more objects include master data objects for use by all systems in a data management system, and the one or more target systems are part of the data management system.

54 Claims, 10 Drawing Sheets

U.S. PATENT DOCUMENTS

| | | | |
|---|---|---|---|
| 5,710,884 A | 1/1998 | Dedrick | |
| 5,754,939 A * | 5/1998 | Herz et al. | 455/3.04 |
| 5,758,031 A | 5/1998 | De Silva | |
| 5,859,972 A | 1/1999 | Subramaniam et al. | |
| 5,911,139 A | 6/1999 | Jain et al. | |
| 5,966,715 A | 10/1999 | Sweeney et al. | |
| 6,018,742 A | 1/2000 | Herbert, III | |
| 6,029,195 A * | 2/2000 | Herz | 725/116 |
| 6,032,147 A | 2/2000 | Williams et al. | |
| 6,067,525 A | 5/2000 | Johnson et al. | |
| 6,226,650 B1 * | 5/2001 | Mahajan et al. | 707/625 |
| 6,236,997 B1 | 5/2001 | Bodamer et al. | |
| 6,324,647 B1 | 11/2001 | Bowman-Amuah | |
| 6,330,598 B1 | 12/2001 | Beckwith et al. | |
| 6,405,132 B1 | 6/2002 | Breed et al. | |
| 6,480,755 B1 | 11/2002 | Ootani et al. | |
| 6,487,594 B1 * | 11/2002 | Bahlmann | 709/225 |
| 6,529,948 B1 * | 3/2003 | Bowman-Amuah | 709/217 |
| 6,532,455 B1 * | 3/2003 | Martin et al. | 706/47 |
| 6,567,818 B1 | 5/2003 | Frey et al. | |
| 6,697,792 B2 * | 2/2004 | Bunney et al. | 707/1 |
| 6,711,456 B2 | 3/2004 | Yokomori et al. | |
| 6,718,361 B1 * | 4/2004 | Basani et al. | 709/201 |
| 6,738,682 B1 | 5/2004 | Pasadyn | |
| 6,754,666 B1 | 6/2004 | Brookler et al. | |
| 6,768,944 B2 | 7/2004 | Breed et al. | |
| 6,842,881 B2 | 1/2005 | Croke et al. | |
| 6,857,123 B1 | 2/2005 | Nuxoll et al. | |
| 6,895,408 B1 | 5/2005 | Kavantzas | |
| 6,915,287 B1 | 7/2005 | Felsted et al. | |
| 7,003,546 B1 * | 2/2006 | Cheah | 709/200 |
| 7,103,605 B1 * | 9/2006 | Hazi et al. | 707/102 |
| 7,177,917 B2 * | 2/2007 | Giotta | 709/219 |
| 7,181,441 B2 * | 2/2007 | Mandato et al. | 707/3 |
| 7,181,523 B2 * | 2/2007 | Sim | 709/226 |
| 7,236,973 B2 * | 6/2007 | Kalthoff et al. | 707/6 |
| 7,305,360 B1 * | 12/2007 | Lamoureux et al. | 705/34 |
| 2002/0065892 A1 | 5/2002 | Malik | |
| 2002/0073114 A1 | 6/2002 | Nicastro et al. | |
| 2002/0087510 A1 | 7/2002 | Weinberg et al. | |
| 2002/0095454 A1 * | 7/2002 | Reed et al. | 709/201 |
| 2002/0116417 A1 | 8/2002 | Weinberg et al. | |
| 2002/0124005 A1 | 9/2002 | Matson et al. | |
| 2002/0128904 A1 * | 9/2002 | Carruthers et al. | 705/14 |
| 2002/0156688 A1 | 10/2002 | Horn et al. | |
| 2002/0161778 A1 | 10/2002 | Linstedt | |
| 2002/0184308 A1 | 12/2002 | Levy et al. | |
| 2002/0194196 A1 | 12/2002 | Weinberg et al. | |
| 2003/0018878 A1 | 1/2003 | Dorward et al. | |
| 2003/0023757 A1 * | 1/2003 | Ishioka et al. | 709/246 |
| 2003/0028519 A1 | 2/2003 | Burgess | |
| 2003/0115336 A1 * | 6/2003 | Auerbach et al. | 709/228 |
| 2003/0135495 A1 | 7/2003 | Vagnozzi | |
| 2003/0161778 A1 | 8/2003 | De Waal | |
| 2003/0191832 A1 | 10/2003 | Satyavolu | |
| 2003/0217152 A1 * | 11/2003 | Kasper, II | 709/226 |
| 2003/0233347 A1 | 12/2003 | Weinberg et al. | |
| 2004/0015408 A1 | 1/2004 | Rauen, IV et al. | |
| 2004/0103103 A1 | 5/2004 | Kalthoff et al. | |
| 2005/0038551 A1 | 2/2005 | Mazumder et al. | |
| 2006/0064456 A1 | 3/2006 | Kalthoff et al. | |

FOREIGN PATENT DOCUMENTS

| | | |
|---|---|---|
| DE | 10049940 A1 | 4/2002 |
| EP | 447341 A2 * | 9/1991 |
| WO | WO 01/37097 | 5/2001 |
| WO | WO 02/25471 | 3/2002 |
| WO | WO 02/25500 | 3/2002 |
| WO | WO 02/47463 | 6/2002 |
| WO | 03/093998 | 11/2003 |

OTHER PUBLICATIONS

Sheth and Larson, "Federated Database Systems for Managing Distributed, Heterogeneous, and Antonomous Databases", *ACM Computing Surveys*, 1990, 22(3): 184-236.

Anonymous "Data Profiling the Foundation for Data Management" *DataFlux Corporation*, Jul. 1, 2004, pp. 1-17.

Garcia et al. "Immunization Registries DeDuplication and Record Matching," *White Paper*, 1999, pp. 1-11.

Georgakopoulos et al. "An Overview Workflow Management: From Process Modeling to Workflow Automation Infrastructure," *Distributed and Parallel Databases*, 1995, vol. 3, No. 2, pp. 119-153.

Rahm et al. "Data Cleaning: Problems and Current Approaches," *Quarterly Bulletin of the Computer Society of the IEEE Technical Committee on Data Engineering*, Dec. 2000, pp. 1-11.

U.S. Appl. No. 09/577,268, filed May 2000, Hazi et al.

U.S. Appl. No. 09/643,207, filed Aug. 2000, Brookler et al.

U.S. Appl. No. 09/643,316, filed Aug. 2000, Brookler et al.

Haerder T. et al., "Integritaetskontrolle," Datenbanken Konzepte und Techniken Der Implementierung, 1999, pp. 397-405, XP002294581 [translation provided].

Haerder T. et al., "RX-Sperrverfahren," Datenbanken Konzepte and Techniken Der Implementierung, 1999, pp. 419-420, XP002294552 [translation provided].

Chaudhuri, Surajit, et al., "An Overview of Data Warehousing and OLAP Technology," SIGMOD Record, New York, NY, USA, vol. 26, No. 1, Mar. 1997, pp. 65-74, XP002193792, ISSN: 0163-5808.

Rahm, Erhard, et al., "Data Cleaning: Problems and Current Approaches," IEEE Bulletin of the Technical Committee on Data Engineering, vol. 23, No. 4, retrieved from the Internet Dec. 2000 at http://lips.informatik.uni-leipzig.de:80/pub/2000-45, XP002284896, 11 pgs.

"SyncML Protocol, version 1.0," Internet Citation, Dec. 7, 2000, XP002217356, 60 pgs.

Bertino, Elisa, et al., "Data Security," Proceedings of the Twenty-Second Annual International Computer Software and Applications Conference, Vienna, Austria, Aug. 19-21, 1998, Los Alamitos, CA, USA, Aug. 19, 1998, (CompSAC '98), XP010305455, pp. 228-237.

Bon, M., et al., "Sharing Product Data Among Heterogeneous Workflow Environments," CAD 2002: Corporate Engineering Research, Geman Informatics Society, Mar. 4-5, 2002, Dresden, Germany, XP002268575, pp. 1-10.

Chandramouli, Ramaswamy, "Application of XML Tools for Enterprise-Wide RBAC Implementation Tasks," Proceedings of the 5th ACM Workshop on Role-Based Access Control, Berlin, Germany, Jul. 26-27, 2000, XP000958089, pp. 11-18.

Choi, Jin Oh, et al., "Update Propagation of Replicated Data in Distributed Spatial Databases," Proceedings of Database and Expert Systems Applications: Tenth International Conference, Florence, Italy, Aug. 30, 1999-Sep. 2, 1999, DEXA '99 (Lecture Notes in Computer Science vol. 1677), Berlin, Germany, Springer-Verlag, Germany, XP009022583, pp. 952-963.

Chou, H-T. et al., "Versions and Change Notification in an Object-Oriented Database System", Proceedings of the Design Automation Conference, Anaheim, Jun. 12-15, 1988, Proceedings of the Design Automation Conference (DAC), New York, IEEE, US, vol. CONF. 25, Jun. 12, 1988, pp. 275-281, XP010013006, ISBN: 0-8186-0864-1.

Ferreira Rezende, Fernando de, et al., "A Lock Method for KBMSs Using Abstraction Relationships' Semantics," Proceedings of the International Conference on Information and Knowledge Management, CIKM, ACM, New York, NY, USA, 1994, XP002943684, pp. 112-121.

Hong, B. et al., "Modeling of Version Relationships for CAD Databases", Computers and Communications Technology Toward 2000, Seoul, Aug. 25-28, 1987, Proceedings of the Region 10 Conference, (TENCON), New York, IEEE, US, vol. 1, Conf. 3, Aug. 25, 1987, pp. 142-146, XP000011783.

Kamita, T. et al., "A Database Architecture and Version Control for Group Work", System Sciences, 1994, vol. III: Information Systems: Decision Support and Knowledge-Based Systems, Proceedings of the Twenty-Seventh Hawaii International Conference on Wailea, HI, US, Jan. 4-7, 1994, Los Alamitos, CA, US, IEEE Comput. Soc., Jan. 4, 1994, pp. 438-447, XP010097053, ISBN: 0-8186-5070-2.

Rana, S.P. et al., "Version Support for Manufacturing Database Systems", International Conference on Industrial & Engineering Applications of Artificial Intelligence & Expert Systems, Tullahoma, IN, US, New York, NY, US, vol. 2, Jun. 6, 1989, pp. 779-784, XP000605772.

"European Application Serial No. 03794019.4, Summons to attend oral proceedings, mailed Oct. 11, 2010", 22 pgs.

Do, Hong Hai, et al., "On Metadata Interoperability in Data Warehouses", [Online]. Retrieved from the Internet: <URL: http://lips.informatik.uni-leipzig.de/pub/2000-13/en>, (Mar. 2000), 22 pgs.

Hernandez, Mauricio, et al., "Real-World Date is Dirty: Data Cleansing and the Merge/Purge Problem", Data Mining and Knowledge Discovery 2, (1998), 48 pgs.

Berndtsson et al., Task Sharing Among Agents Using Reactive Rules, Cooperative Operation Systems, 1997. COOPIS '97., Proceedings of the Second IFCIS International, Jun. 24-27, 1997, pp. 56-65.

Hill et al., "Data Transformation: Key to Information Sharing" Gartner Group Strategic Analysis Report, Sep. 29, 1998, pp. 1-60.

* cited by examiner

DISTRIBUTING DATA IN MASTER DATA MANAGEMENT SYSTEMS

CROSS-REFERENCE TO RELATED APPLICATIONS

This application claims priority based on U.S. Provisional Patent Application No. 60/429,688 for "Dynamic Data Access," filed on Nov. 27, 2002, the disclosure of which is incorporated here by reference in its entirety.

BACKGROUND

The present invention relates to data processing and to distributing data in data management systems.

Information technology ("IT") environments can consist of many different systems performing processes, such as business processes, on common master data. The different systems can be part of the same entity or can be part of different entities, such as vendors or contractors. The master data used for the processes can be stored in a number of different locations, systems, and/or incompatible formats. Branch offices of a company can work largely independently, adopted companies can introduce new software solutions to a group of affiliated companies, systems from different vendors can be linked. Different master data models can make it difficult to integrate business processes in these scenarios.

Master data can become trapped and siloed in different systems. Master data that is not aligned across an IT environment can lead to data redundancies and irrelevant or incorrect information. For example, if two local branches of the an international company each have the same local branch of a second international company as a business partner, each international business partner can be maintained twice, with no correlation between the two "business partner" master data objects. This can result in high costs for redundant multiple content maintenance. Further, business analytics performed with redundant or obsolete information can result in poor business decisions. In the above example, a company-wide analytic process can fail to detect the correlation between the "two" partners, and business value that could be leveraged out of recognizing these business partners as international business partners with two local branches would be lost.

SUMMARY OF THE INVENTION

The present invention provides methods and apparatus, including computer program products, for sharing data in a homogeneous environment.

In general, in one aspect, the invention features methods and apparatus, including computer program products, for distributing data in a data management system. The technique includes identifying one or more objects in a central data store for distribution, determining if a routing exists for at least one object of the one or more objects, and distributing the at least one object to one or more target systems specified by the routing. The one or more objects include master data objects for use by all systems in a data management system, and the one or more target systems are part of the data management system.

The invention can be implemented to include one or more of the following advantageous features. The at least one object can be distributed immediately and/or periodically. Identifying one or more objects can include identifying one or more packets of objects, where distributing the at least one object includes distributing the one or more packets of objects.

The at least one packet of objects can be distributed immediately and/or periodically. The technique can also include determining which parts of the objects can be distributed. The technique can further include receiving information from the one or more target systems indicating which objects are requested by the one or more target systems. Determining one or more target systems to which to supply at least one object can include determining one or more target systems to which to supply at least one object based on subscription information received from the one or more target systems.

Frequency information can be received from the one or more target systems indicating how often to distribute the at least one object to the one or more target systems, and distributing the at least one object can include distributing the at least one object at a frequency indicated by the received frequency information. Distribution date information can be received from the one or more target systems indicating from which date to distribute the at least one object to the one or more target systems, and distributing the at least one object can include distributing the at least one object from a date indicated by the received distribution date information.

User input specifying one or more target systems to which to supply at least one object can be received, and determining the one or more target systems to which to supply at least one object can include determining the one or more target systems in response to the user input. Identification of the one or more target systems to which to supply the at least one object can be stored in a distribution profile for the at least one object, and distributing the at least one object can include distributing the at least one object based on the distribution profile for the at least one object.

Information received from the one or more target systems can be stored in a distribution list for the at least one object, where the information includes information including one or more of subscription information, distribution start information, frequency information and recipient type information. One or more of the identified objects can be published, where the one or more published objects can be available for subscription by a client system.

A report can be generated. Generating the report can include generating a report including information regarding at least one of published objects, subscriptions and distribution of objects. Generating a report regarding distribution of objects can include generating a report including information regarding one of a last distribution of an object and local replicates of an object. The report can also include a process monitoring report or a staging report.

In general, in one aspect, the invention features methods and apparatus, including computer program products, for receiving dynamic access data. The technique can include searching, from a client system, for objects stored in a central system, where the objects include published objects and objects to which the client system is authorized to subscribe, subscribing to one or more objects from a list of available objects, and receiving data from the central system in response to the subscription.

The invention can be implemented to include one or more of the following advantageous features. Distribution frequency for receiving data from the central system can be defined, a distribution start date can be defined, and subscribing to one or more objects can include selecting a distribution profile from the list of available objects.

In general, in one aspect, the invention features a system for sharing data. The system includes one or more client systems and a central module of an entity. The central module includes a central data store to store data objects for the entity, where the data objects are for use by the one or more client systems.

The central module is configured to select data objects to distribute to the one or more client systems, and to distribute data objects to the one or more client systems based on one or more of subscriptions to data objects, historic subscriptions to data objects and rule-based routing.

The invention can be implemented to include one or more of the following advantageous features. The central module can also be configured to generate a report regarding distribution of data objects to the one or more client systems. The report can include one or more of a publishing related report, a subscription related report, a distribution related report, a process monitoring report and a staging report.

The invention can be implemented to realize one or more of the following advantages. A collaborative master data management system for master data allows centralized management of master data. Centralized distribution of data allows consistent distribution of master data to client systems. Flexibility is provided in the frequency and manner of data distribution. Data can be distributed in individual data objects or in packets of data. Data can be distributed immediately or periodically. Data is provided only to systems that need the data. A central system decides what data will be distributed and to which client systems, based on client system needs or content of data objects. In some cases, client systems can subscribe for data distribution.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIG. 10 is a screen shot of an user interface ("UI") for assigning objects to be published.

FIG. 12 is a screen shot of an UI for subscribing to published objects.

Like reference numbers and designations in the various drawings indicate like elements.

DETAILED DESCRIPTION

Figure 1A:
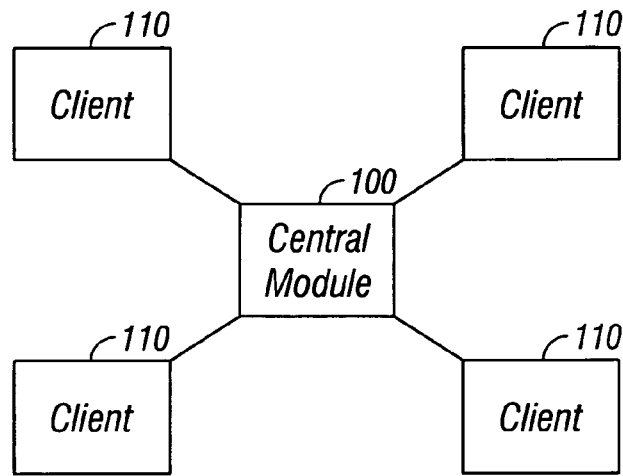
FIGS. 1A and 1B are block diagrams illustrating a collaborative master data management system.

As shown in FIG. 1A, a collaborative master data management ("cMDM") system includes a central module 100 and one or more client modules 110. Each client module 110 is linked directly to the central module 100.

The central module 100 can include a central system representing a centralized control of data management for an entity, such as a business or an organization. The client modules 110 can include systems or groups performing processes on master data. For example, the client modules 110 can include systems and/or groups involved in a product creation process. In this example, the client modules 110 can include a legacy module, an e-procurement module, an e-sales module, a sourcing module, a collaborative engineering module, a manufacturing module and enterprise resource planning ("ERP") modules.

The master data can be stored in the client module 110, in the central module 100 or in both, depending on the implementation. The central module 100 allows the master data used by each client 110 to include master data that is shared by all clients 110. Traditionally, client modules 110 would communicate directly with each other in a point to point architecture. For example, a manufacturing module might need to share master data with an e-procurement module, an e-sales module and a collaborative engineering module, among others. In traditional systems, the manufacturing module would receive data from or transmit data to the appropriate module, which could lead to inconsistency in data or the use of obsolete data, if data is not updated in the module transmitting the data for sharing. In the system described with reference to FIGS. 1A and 1B, data is managed through the central module 100. The central module 100 ensures consistent master data, and the distribution of the master data.

Figure 1B:
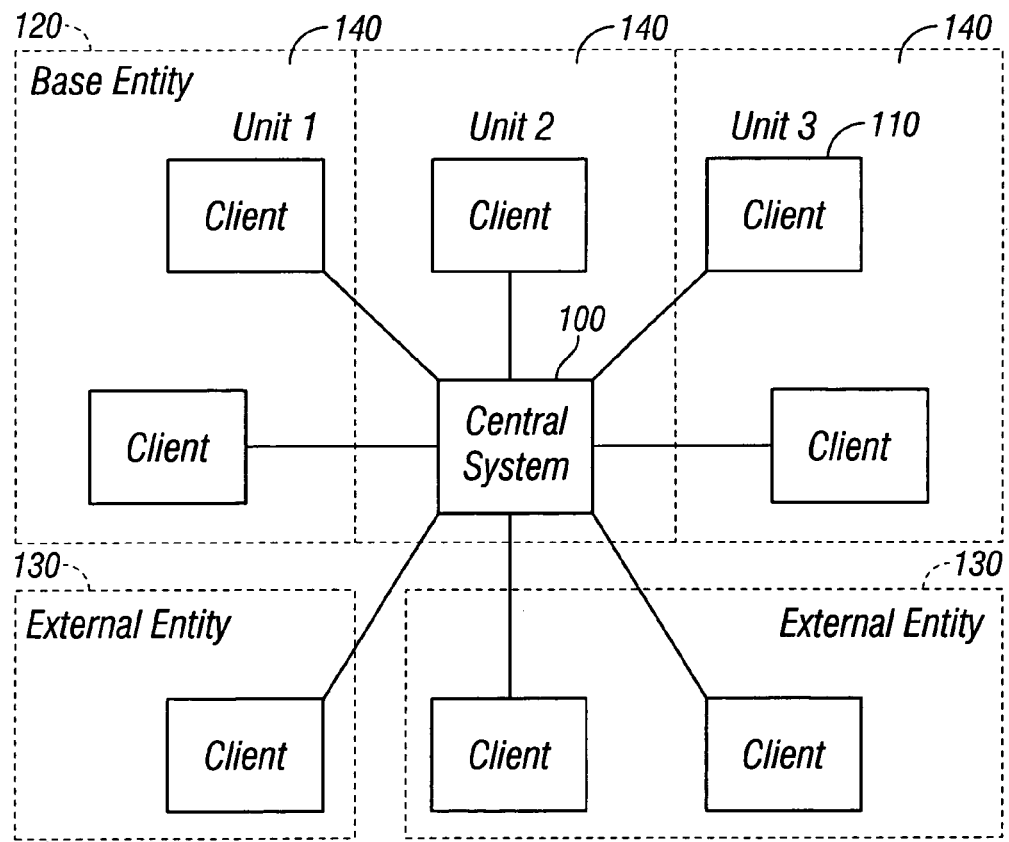

As shown in FIG. 1B, the cMDM system can be implemented to be used across a plurality of entities 120, 130. The central module 100 can be part of a base entity 120. The client systems 110 can be part of the base entity 120 or part of an external entity 130. For example, the base entity 120 can include an enterprise including client modules 110 for ERP, legacy, c-procurement and e-sales. The base entity can be divided into units 140, where each unit can include one or more clients 110. The external entities 130 can include a contractor including a client 110 for manufacturing and a supplier including clients 110 for collaborative engineering and sourcing.

In another example, the base entity 120 can include a customer service entity while an external entity 130 can include an enterprise. Customer information that may normally be dispersed over multiple client modules 110 can be consolidated through central system 100.

The centrally managed master data can be used for processes such as cross-group reporting, data integration for mergers and acquisitions, reducing the diversity of parts, supporting product maintenance, simplification of customer management, and supporting catalogs such as through merging catalog contents and bundling of purchasing activities into a smaller number of vendors. The cMDM system can also support versioning and change management. As versions are created or changes made, the data for the versions or changed data can be managed through central module 100, as described below.

A setup of a cMDM system can be performed before data is exchanged between the cMDM system and client modules 110. Identification attributes are specified for master data objects and rules for matching are established. The setup of attributes and rules for matching can be performed with regard to the entity using the cMDM system, or with regard to the object needs in general. A matching process performed on master data objects received from client modules can be used to manage the master data objects.

Specifying attributes can include matching different objects from different client applications or different client modules 110. Specifying attributes can also include linking elements of the matched structures together so that master data objects received from different client systems can be compared.

The specified attributes can also be ranked during setup. The ranking of attributes can be used during a matching process to determine whether two master data objects are identical. Thus, if an attribute that is ranked higher doesn't match between two objects, it is more likely that they are not identical or similar than if an attribute ranked lower on the list does not match.

The cMDM system can be implemented in at least three different scenarios, as described with reference to FIGS. 2-7. The scenarios can be implemented separately or introduced in an evolutionary manner, by starting with a content consolidation scenario and moving to a master data harmonization scenario or moving from a master data harmonization scenario to a central master data management scenario. The different scenarios can also be used together. For example, central master data management can be used for some object types while master data harmonization is used for the rest. The mixing of the scenarios will be discussed in more detail below.

Content Consolidation

Figure 2:
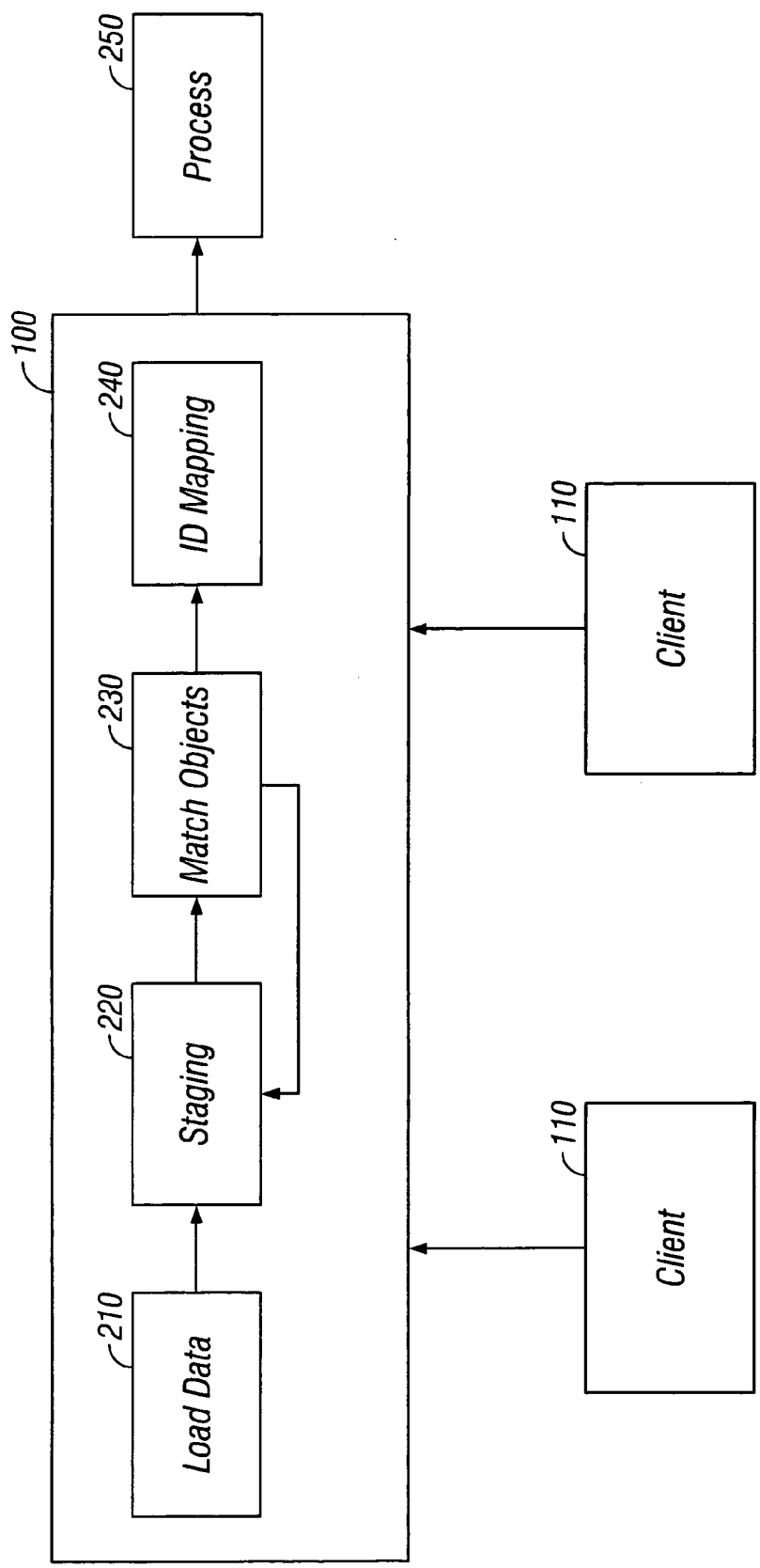
FIG. 2 is a block diagram illustrating a content consolidation implementation of a collaborative master data management system.

FIG. 2 is a block diagram illustrating a content consolidation scenario for a cMDM system. Central module 100 can include a load module 210, a staging module 220, a match module 230 and an ID mapping module 240. The consolidated content resulting from the processes performed in central module 100 can be used in processes 250 such as business analysis, (e.g., global spending analysis) or creation of central catalogs (e.g., a supplier product catalog).

At load module 210, master data objects are received into the central module 100. Master data objects are uploaded into central module 100 in the form in which they were maintained in their local applications (client modules 110). At staging module 220, a user at the central module 100 can determine if the master data objects are loaded correctly. For example, the user can check the content of the master data object loaded in load module 210 to make sure that the content of the master data object is correct. The master data objects can be cleansed in the staging module 220 to standardize the content of the master data objects. For example, if the standard format for abbreviating New York is "NY," and one of an input master data object has the abbreviation as "N.Y.," the content of the input master data object can be changed to "NY" by removing the periods in between the "N" and the "Y." Data cleansing can also include removing mistakes and inconsistencies to make data more accurate:

The staging module 220 can also be used as an intermediate storage for received master data objects for a master data client. The intermediate storage can be used while processing matching and mapping routines described below with respect to match module 230 and mapping module 240, respectively. The intermediate storage can also be used during individual user interaction before upload of master data objects.

Matching processes can also be completed in the staging module 220. The master data objects are forwarded to a match module 230. If the match module 230 does not automatically match the master data objects based on the identified attributes, the master data objects can be returned to the staging module for manually deciding whether the master data objects match.

At match module 230, a matching process can be performed on the uploaded master data to identify identical or similar data objects. Identical data objects are master data objects that are semantically identical, and which are received from different client modules 110. Identical data objects can have two different object IDs. Duplicate data objects are semantically identical master data objects within the same system, such as a client module 110. Possible duplicates are recognized automatically and reported. One or more of the duplicate data objects can be removed from the client system.

The matching process includes recognizing similarity between master data objects. The matching process can include identifying attributes of the data objects and comparing the attributes. The attributes that are compared can include attributes that are valid entity-wide for master data object types, so that identical and similar data objects can be recognized, although the content of the attributes can differ from system to system. Thus, different data formats and structures can be retained in different systems.

If the amount of match between two master data object is within a certain range, the results of the matching process may be considered to be unresolved. For example, if two master data objects match 50-80%, the results of the matching process can be considered unresolved. For example, if a master data object to be matched is a business partner, and four of five attributes match another business partner master data object, the amount of match would be 80%. Thus, the issue of whether the two objects match can be considered to be unresolved. The master data object can be returned to the staging module for an user to manually determine if the master data object matches another master data object.

The mapping module 240 receives the results of the matching process from the match module 230. At mapping module 240, the similar or identical objects can be mapped to each other. For example, an object identification ("ID") of one object can be mapped to an object ID of a similar or identical object. The mapping information can be updated each time a change is made to a data object. The mapping can be performed automatically based on rules established during set up of the master data management system. The mapping can be stored in a mapping table. The mapping information can change based on changes made to a master data object. For example, if "N.Y." in master data object A is changed to "NY," master data objects that were not mapped to master data object A can now be considered identical to master data object A and master data objects that were mapped to master data object A will need to be changed. Thus, changes can be managed through mapping information and updates to mapping information by making the mapping information available to client modules 110. Similarly, when a new version consisting of a group of data objects is defined, mapping information and updates to the mapping information can be used to manage the version.

The mapping information can be provided to process module 250. Process module 250 can include a data warehouse, such as a business information warehouse, for system-wide reporting. The processes performed in process module 250 can include creation of a central catalog or company-wide analysis and reporting, such as global spend analysis or mergers and acquisitions.

Figure 3:
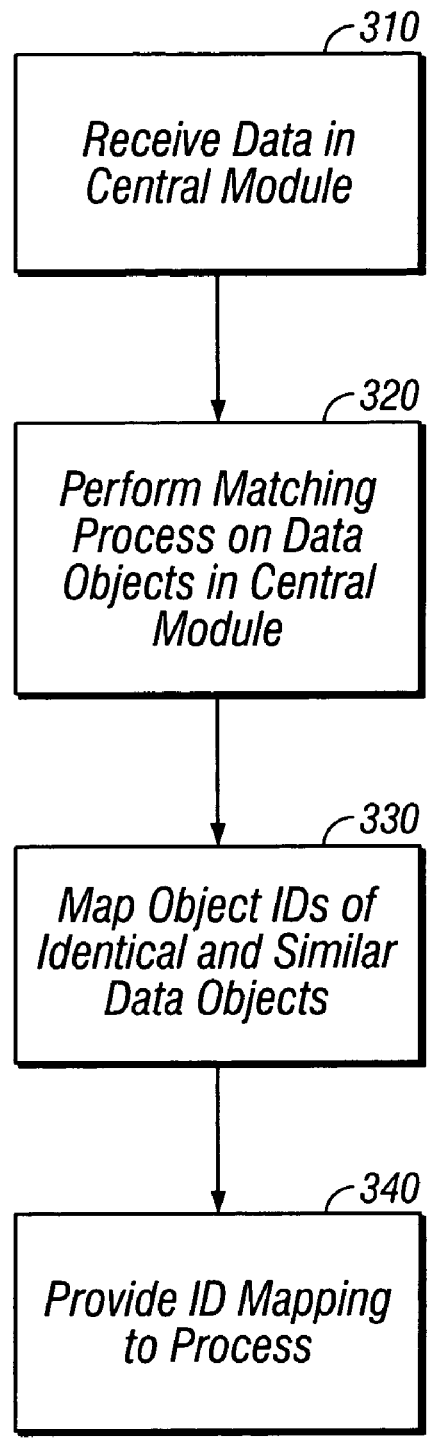
FIG. 3 is a flow diagram illustrating a method for consolidating data.

FIG. 3 is a flow diagram illustrating a method for consolidating data. Data is received into central module 100 from one or more client modules 110. (Step 310) If the received data content is not aligned with content of a central system in central module 100, the received data can be cleansed.

A matching process is performed on objects of data in the central system to determine if there are identical or similar objects in the central system. (Step 320) The matching process can include comparing identifying attributes of the objects. The matching process can also include identifying duplicates. If two or more objects are found to be duplicate objects, one or more of the duplicate objects can be avoided from being entered into the central module. The duplicate master data objects can be transferred to the staging module 220, where one of the duplicate master data objects is removed from the central module 100. The cMDM can also support removal of one or more of the duplicate master data objects from the system from which the duplicate objects were received.

If identical or similar objects are found, the central module can perform a mapping process. (Step 330) Object IDs of identical objects can be mapped to each other, and object IDs of similar objects can be mapped to each other. The object mapping information can be provided to a process. (Step 340) As discussed above, providing the mapping information to a process can include providing the mapping information to a data warehouse, such as a business information warehouse, for use in system-wide analysis and reporting. The mapping information can also be provided to the client modules 110.

Master Data Harmonization

Figure 4:
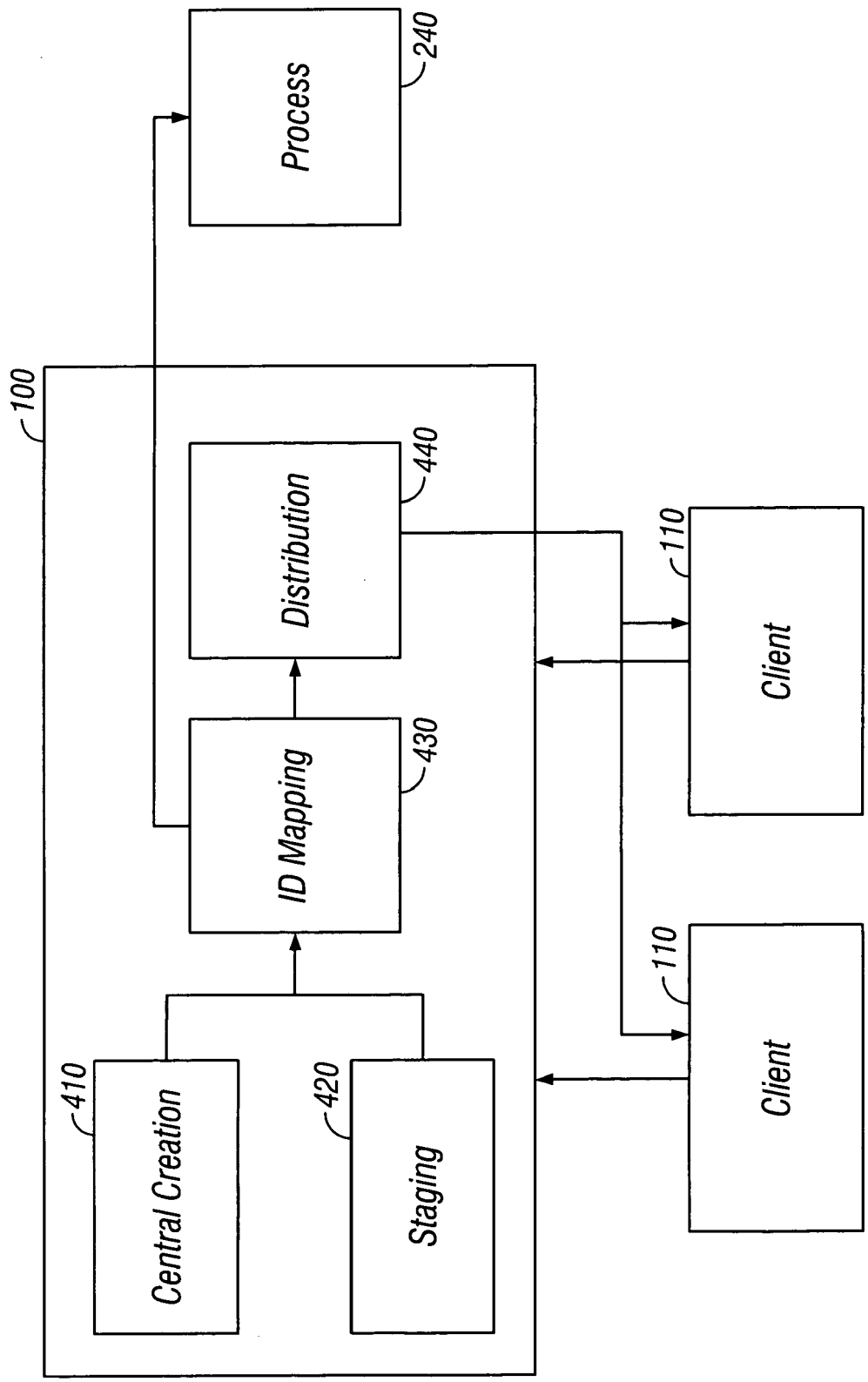
FIG. 4 is a block diagram illustrating a master data harmonization implementation of a collaborative master data management system.

FIG. 4 is a block diagram illustrating a second scenario for cMDM. The second scenario includes a master data harmonization implementation. This scenario can be implemented by adding master data storage to a content consolidation implementation. This scenario can be used to enable the maintenance and consistent distribution of global attributes of the master data. The harmonized content resulting from the processes performed in central module 100 can be distributed to client modules 110 and process module 240 to be used in applications such as, for example, business partner administration, central provision of sales articles, definition and administration of non-variable parts.

The master data objects can be created in the central module 100, in central creation module 410, or in client modules 110. Master data objects created in client modules 110 are received in staging module 420. Portions of the master data objects and the mappings between master data objects can be stored in the central module 100. The portions of the master data objects stored can include global attributes of the master data objects.

Master data objects created in central creation module 410 can be created to include only global attributes of the master data object. Global attributes can include the identifying attributes. Which attribute is to be maintained for each object type can be dependent on information requirements and the system landscape. A framework can be added to the cMDM to enlarge an object model without doing any modification of the software used to create the master data object in the local system. The framework can deal with new issues and new fields. For example, the object description (data model for an object) can be tailored to a central instance. For example, fields may exist in data models in one system that do not exist in data models for another system. The framework can also support updating user interfaces for client systems receiving master data objects having different attribute fields. After distribution of the objects, as discussed below, the distributed objects can be provided with additional attribute values in the client modules 110.

Locally created master data objects can be created using the local application of the client 110. Client modules 110 can distribute the global attributes of the locally created master data objects into staging module 420. A cross system search can be made for the master data object before it is created in the client module 110. The master data object is created if no similar master data object exists. If a similar master data object does exist, central module 100 makes the similar master data objects available to the user at the client module 110. For example, the central module 100 can make similar master data objects available to the user at a client module 110 through a server. Thus, the similar master data object can be transferred to a server in the central module 100 and then transmitted to a client system at a client module 110.

The user can subscribe to the similar master data object, and mapping information can be updated to include the new local system. If no similar object is found, after creation of the master data object, the created master data object can be transmitted to other target systems.

Continuous matching processes can be performed in matching and mapping module 430. For example, mapping can be performed in response to a request to create a master data object in central creation module 410. The continuous matching processes can be used to identify identical and similar data objects. The identical and similar data objects can be mapped to each other, as described above.

Duplicate objects identified by the matching process can be avoided from being created in local systems. For example, if a local system requests a master data object for a new business partner, a user at the central module 100 can check to see if the business partner master data object already exists in the central module 100. If the business partner master data object does exist in the central module, the master data object can be distributed to the client system requesting the new master data object. If the user recognizes that the existing business partner master data object already exists in the target system, creation of a duplicate master data object is avoided. Mapping information can be provided to process module 240 for processes such as business-wide analysis.

The global attributes of the master data objects, including mapping information, can be distributed to the various client modules 110 through distribution module 440. Thus, all systems are supplied with the same global attributes after distribution, and business processes can be processed securely. Objects that logically belong together can be changed and distributed together. For example, when the master data include master data for a product, the objects that belong to the product, such as product structures and documents, can be collected together in a packet and then, distributed in one context to a recipient client module 110. A packet can include a group of individual objects that are linked through relationships including dependencies, such as objects in a product structure. A packet can be collected according to information requirements of the recipient client module 110, and can be transferred in a certain sequence.

For example, if a BOM changes or is to be distributed to a target system, rules associated with mappings for some specified systems can indicate that product masters for materials have to be transferred to a specified system before the BOM so that the specified system can recognize the product ID for the materials. Thus, sequencing of objects to distribute can be enabled to comply with semantics and requirements of target systems.

Client modules 110 can complete master data information for the received master data objects in the local environment. Changes to the master data can also be managed centrally in central module 100. The changes can be received, approved, and then, distributed to client modules 110.

Master data created in central module 100 can be created in response to a request from a client module 110. For example, a business user at a client module 110, using a client system, can fill out a request form for a new product master and transmit the form to a user at central system in a central module 100. Forms can be checked to ensure that the forms are correctly filled. For example, the forms can be checked semantically or units of measurement can be checked to ensure the correct units are used. The user at the central system can view and accept the request. The user at the central system can then check for duplicates, complete the given information, and then, create and distribute the new product master.

Figures 5A, 5B:
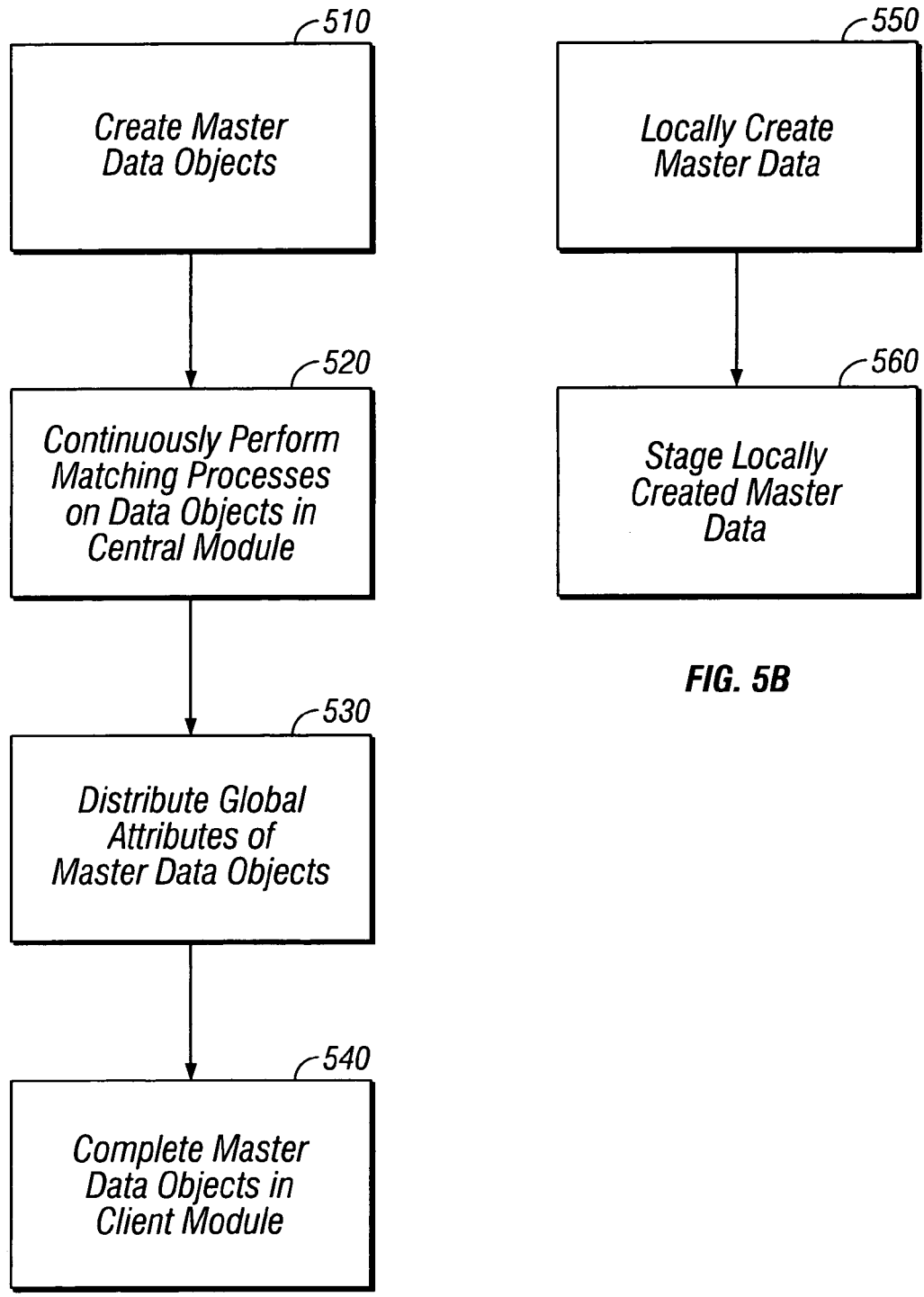
FIGS. 5A and 5B are flow diagrams illustrating a method for master data harmonization.

FIGS. 5A and 5B are flow diagrams illustrating methods for master data harmonization. Referring to FIGS. 1A, 1B, 4 and 5A, master data harmonization can include the creation of master data objects in the central module 100 as well as the client modules 110. (Step 510)

The master data objects can be created in three ways in master data harmonization. A new master data object can be created in the central module 100 directly or a new master data object can be created in the central module 100 in response to a request from a client module 110. A master data object can also be created locally in a client module 110 and transferred to a staging module 420. Master data created locally, in client modules 110 can be uploaded to central module 100.

The created objects can be stored in central module 100. The master data objects stored in central module 100 can include global attributes of the master data objects.

Continuous matching processes can be performed on the stored master data objects. (Step 520) The continuous matching processes can be used to identify duplicate, identical and similar data objects. Duplicate objects found can be removed, and object IDs of identical and similar objects can be mapped.

Master data object information, including global attributes of the master data objects and mapping information, can be distributed to the client modules 110. (Step 530) The master data information for the master data objects received in the client systems can be completed in the client modules 110. (Step 540)

FIG. 5B illustrates a method of master data harmonization where the master data is created locally, as discussed above. A master data object is created locally. (Step 550). The locally created master data object is staged. (Step 560).

Central Master Data Management

Figure 6:
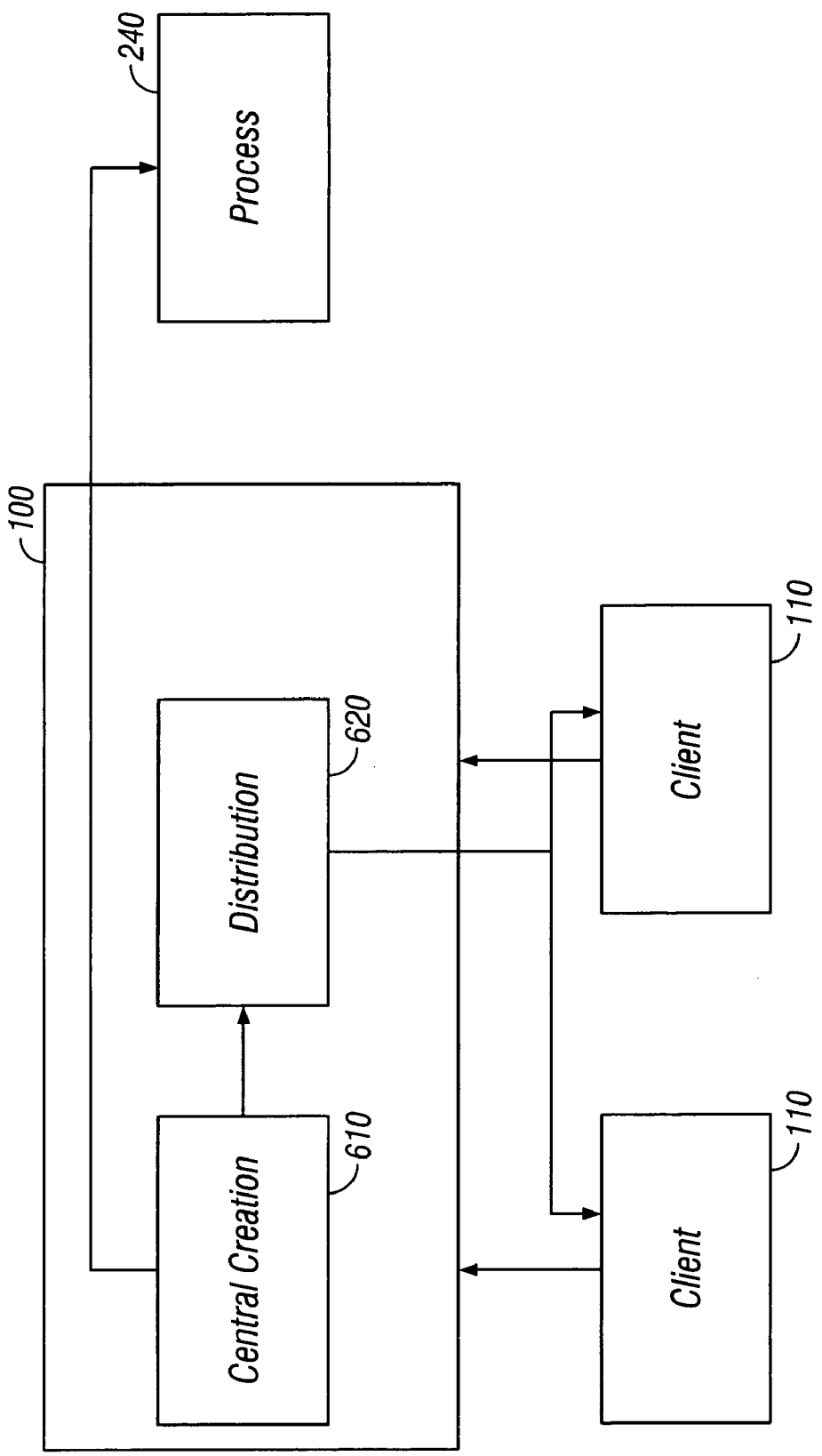
FIG. 6 is a block diagram illustrating a central master data management implementation of a collaborative master data management system.

FIG. 6 is a block diagram illustrating a central master data management implementation of a cMDM system. In the central master data management scenario, master data is controlled completely in the central module. In this implementation, all master data information resides centrally in central module 100. This implementation can be used for applications such as a central product data pool supplying product data to multiple locations for production, assembly, sales and distribution.

At central creation module 610, master data objects can be created. The created master data objects can include complete object information including complete object definition, object mapping information and object dependencies. The master data objects can be created in response to a request from a client module 110. Matching processes can be performed in response to the request, and mapping information can be included in the data object information stored in the central module 100. If identical objects exist in the central module 100, the requesting client module 110 can be notified that an identical object exists, and a new master data object is not created or mapped to an existing object. The mapping information can be updated.

At distribution module 620, the centrally maintained master data information can be distributed as individual objects as they are defined in the client modules 110. The objects can be distributed in packets. Objects that belong together can be changed and distributed together. If the master data includes product model master data, the objects that belong together, such as products, BOMs (bills of material), and documents, are collected together in a consistent packet and distributed together. The objects can be collected according to information requirements of the recipient client module 110. For example, the objects can be collected in reference to a particular view for a product. A view can include product relevant attributes, such as purchasing dates. Thus, a group of objects can be linked according to usage or location. For example a sales view can include attributes or content of objects that are related to or used by a sales department.

As discussed above, the scenarios can be used together. For example, central master data management can be used for business partner master data objects, where all of the business partner master data object information is maintained in central module 100. The central module 100 can store only global attributes for the rest of the data objects, such as product master data objects.

Figure 7:
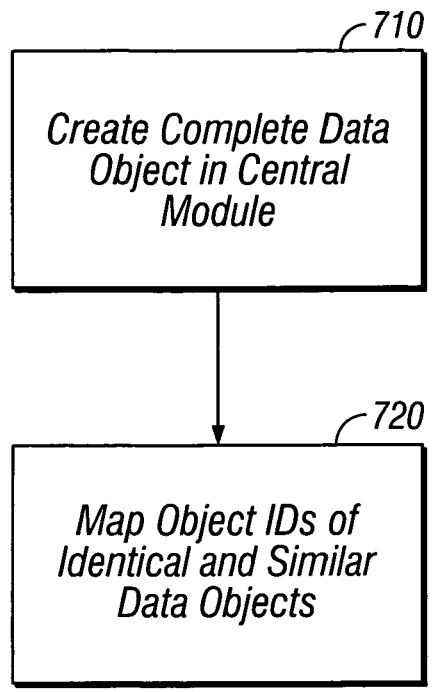
FIG. 7 is a flow diagram illustrating a method for central master data management.

FIG. 7 is a flow diagram illustrating a method for central master data management. The central master data management process can be performed in a homogeneous environment. Referring to FIGS. 1A, 1B, and 6, at least one data object is created in a central module 100 (step 710) The central module 100 can include a central system for a cMDM system. Central module 100 can store complete data object information which can be distributed to client modules 110. Thus, the created data object can include complete object information including a complete object definition, mapping information mapping the data object to other objects, and dependencies to other objects.

The data object can be created in response to receiving a request from a client module 110 to create the data object. A matching process can be performed on the request to determine if a similar or identical data object exists in the central system. If a similar or identical data object is found, the identical data object will be distributed to the requesting system and the distributed object will be mapped automatically.

Data objects from the central system can be distributed to one or more client modules 110. (Step 720) Distributing the data objects can include distributing the data objects to client modules 110 The data objects can be distributed in packets. The packets can be defined in the central module 100 based on requirements information received from a recipient client module 110.

The method of central master data management can also include performing changes to data objects and updating the data objects stored in the central module 100 based on the changes received. The updated data objects can be distributed to the client modules 110.

Master Data Management System

Figure 8:
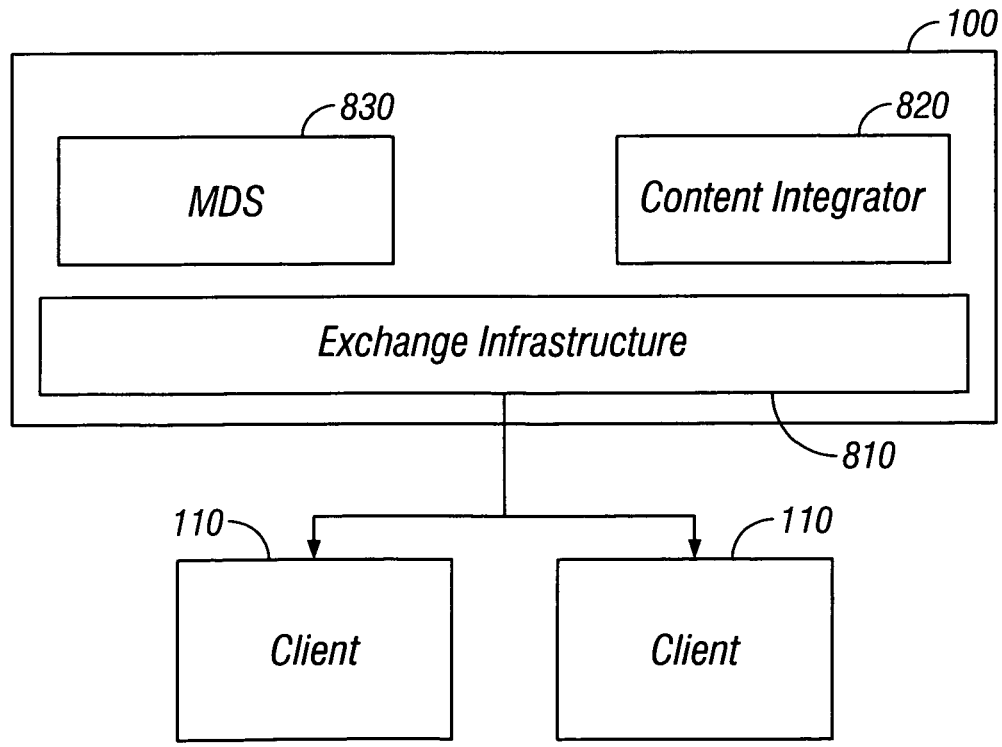
FIG. 8 is a block diagram illustrating a collaborative master data management module.

FIG. 8 is a block diagram illustrating a simplified structure of a central module 100. Central module 100 can include an exchange infrastructure ("XI") 810, a content integrator ("CI") 820, and a master data server ("MDS") 830. The XI 810 can be used for communication between client modules 110 and central module 100.

Master data that is to be distributed is received in XI 810. Distribution can be performed in three different ways, including subscription based distribution, historic distribution and content based distribution. A routing model (not shown) stores information about which systems are interested in the master data. The master data is then sent from the XI 810 to the relevant systems. Queuing can be used to ensure consistent messaging across the XI 810. Messages can be sent in XML (extensible markup language) format between the systems.

CI 820 can correlate master data from different systems by defining identifying attributes for each object. The identifying attributes are fed to CI 820 from different systems in client modules 110 and scanned for analogousness according to predefined rules. The CI 820 saves an object ID for objects in the system landscape, no matter to which system they belong, or to which data model they are subject. Master data objects that are stored in client modules 110 retain the identification defined in the respective client systems storing the master data objects. CI 820 understands that the respective instantiation relates to some other object in the system (using the mapping function). Thus, CI 820 performs the matching processes and preparation of the resulting ID mappings.

In one example, mapping can be done using industry specific standards. Different industries such as Chemicals, Consumer Products ("CP")/Retail and so on, define standards of how an object should be described for their requirements. In one industry, for example, in CP it can be sufficient to describe a product name, description and a class (e.g. 'SWEETS'), while in Chemicals only the class is not sufficient. Thus, attributes and their values are used to describe the chemicals sufficiently. Thus, the attributes can be like a language for an industry. Therefore, the mapping of a MDM standard-xml format to industry specific standards is supported. Industry specific standards include, for example, CIDEX, Pidx, RosettaNet, Pricat.

CI 820 use the mappings for a double checking process for creating objects. The central module 100 receives a request to create a master data object. The CI 820 checks the request for identical objects. If no match is found, the central module generates a new object. The CI 820 then performs a check for the new object. If no match is found, then the central module stores the new master data object. Thus, even if the first check is incomplete based on the description provided by the client module 110, a match may be found when the object is completely created.

Merge strategies can be used to combine two or more objects that are found to be similar or identical. For example, if a master data object for a pump is produced in a purchasing system, a sales system and a production system, one object can be created in central module 100 by merging the three master data objects. For example, a new object can be created where different systems have authorizations for different parts of the object. Thus, a purchasing system can maintain purchasing information for the master data object. Although the purchasing system can view sales and production information, the purchasing system can be given authorization only to maintain the purchasing information.

MDS 830 can include a central data store for storing data objects. MDS 830 can perform the processes of object creation and change. MDS 830 can also provide services for change management, such as unified versioning, and status management. Grouping of changed objects into packets for distribution can also be performed in MDS 830.

Distribution

Data can be distributed as individual objects or as packets. Data can be distributed after distribution targets have been assigned or data has been changed. The frequency of data distribution can be immediately or periodically after objects have been identified for distribution. In one implementation, individual master data objects can be distributed immediately while packets of data are distributed periodically. For example, if a business partner's address is incorrect in a master data object, the updated master data object including the business partner's correct address can be made available immediately. Data objects that are related or have interdependencies can be distributed as a packet to prevent inconsistencies that may occur if the objects are distributed individually. For example, a client module 110 may not subscribe to all of the objects for a view, resulting in missing information. Immediate distribution of a packet each time a change is made to an individual object in the packet may be impractical. Thus, packet distribution frequency can be set to be periodic.

If changes have been made to subscribed objects in a packet, and the changes have been released for distribution, packets for distribution of the changes can be determined according to the relationships and dependencies of the subscribed objects. For example, the distribution of the changes can depend on the content of the object. For example, if a BOM has changed to include a new material, mappings can indicate that the new material should be sent with the BOM. The distribution can also depend on how a target system processes packet data. If a target system process all packet data together, then all of the objects can be transmitted to the target system. If a target system processes only changes in a packet, then the changes can be grouped together and distributed.

The MDS 830 controls which objects can be published (i.e., are available for distribution) and which systems can be (i.e., be target systems for) supplied with which objects. Systems in client modules 110, or their respective data administrators, can subscribe to objects that are published by MDS 830.

Figure 9:
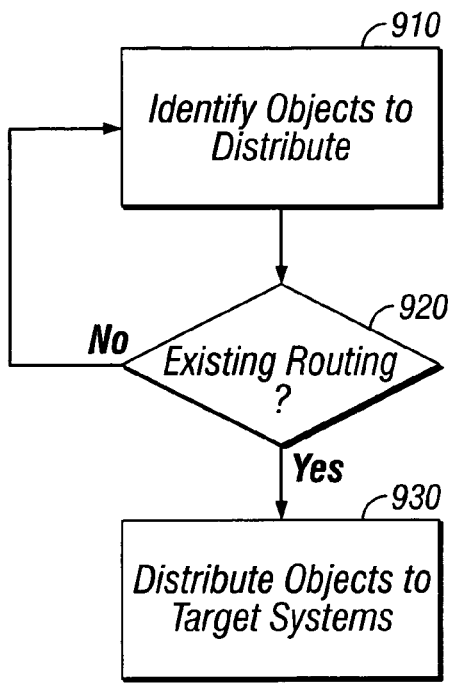
FIG. 9 is a flow diagram illustrating an implementation of a method for distributing data in a collaborative master data management system.

FIG. 9 is a flow diagram illustrating an implementation of a method for distributing data in a cMDM system. Referring to FIGS. 1A and 1B, a central system of the central module 100 identifies master data objects for distribution. (step 910) The identification of master data objects for distribution can be triggered by creation of a master data object, a change to the master data object or by a specific time, if the master data objects are to be distributed periodically.

The central system determines if a routing exists for the master data object to be distributed. (step 920) If no routing exists for a master data object, the central system returns to step 910 to identify master objects to be distributed.

Target systems to which to route the master data objects can be selected from client modules 110. There are three ways in which a target system can be determined for master data object routing. The target system can be determined based on subscription routing, historic routing or rule-based routing. In subscription routing, a target system can subscribe to receive master data objects which have been published or master data objects to which the target system has authorization to subscribe.

Figure 10:
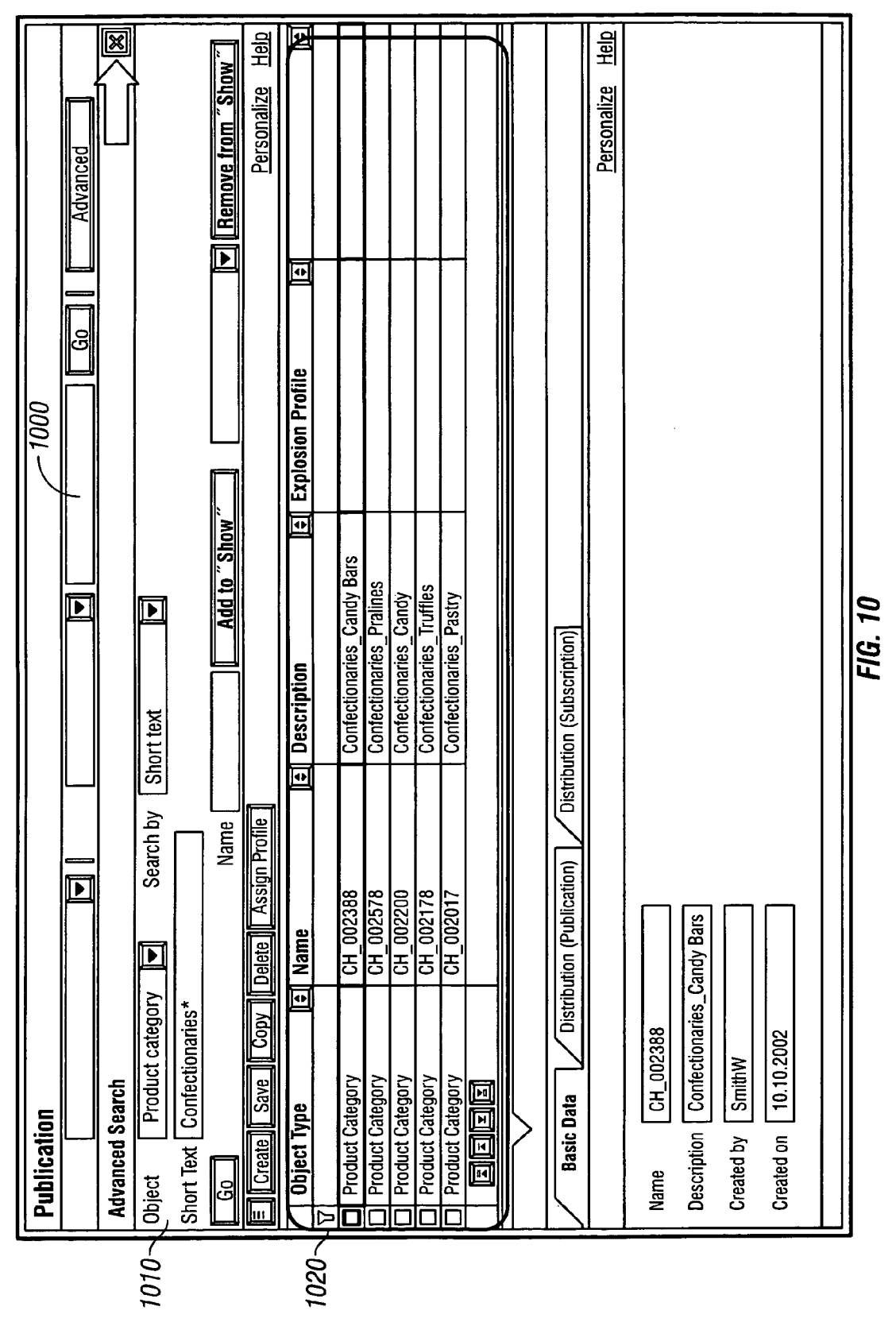

The assignment of objects to be published can be performed in response to user input through an user interface ("UI") 1000 as illustrated in FIG. 10. A user can search for objects to publish in section 1010 of UI 1000. The user can select an object type, such as, for example, product category, product master or business partner. Then, the user can specify a description of the object type. For example, if a user selects an object type of "product category," the user can specify the description to search for as "confectionaries." The user can then be presented with a list of objects to publish. Each listing can include detailed data for the corresponding object as well as publish and subscribe information. Master data objects can be published to allow searches for the data objects by client systems searching for a master data object to which to subscribe. Master data objects are also published to provide the master data object with a profile for distribution.

The target systems can be assigned to master data objects having a profile. Referring to FIG. 10, the profile can be assigned to objects displayed in a search results section 1020 of UI 1000. A user can assign a profile to one or more objects in the list. A profiles can include criteria for distributing the object(s) to a target system. The criteria can include what part of the master data object is to be distributed. For example, the profile can indicate that data from a certain organization, such as a certain plant, that is part of the master data object or a sales view of the master data object should be distributed.

The profile can also include the context in which the master data object should be distributed. For example, if a master data object for new material is to be distributed, then a BOM including the new material should also be distributed. The profile can indicate how far from the master data object the relationships should extend in determining what other objects should be sent in a packet with the master data object. The profile can also include how often the master data object is sent, such as immediately or periodically. The profile can further include at what status or validity the master data object should be distributed. For example, the profile can indicate that the master data object should be distributed at a status of "Ready for Production."

For example, the distribution profile can be specified to be sales relevant data or data depending on organizational aspects. The user can assign profiles to more than one object at a time by selecting a plurality of objects. Previously published objects can be displayed in the list with assigned profiles.

If assignment is based on historic routing, all client modules 110 which are already target systems for a published object or have a replicate of the published object will be assigned to be target systems for the published object to receive changes to the published object.

If the assignment is based on rule-based routing, target systems are determined based on the content of the master data object. For example, if a master data object is an object having a sales view, a rule can instruct that the master data object should be passed on to a customer relations module. The rule can determine whether the object should go to a specific system, such as the customer relations module, and what content should go with it. When this type of assignment is performed, users in client modules 110 do not subscribe to be target systems.

If assignment is based on subscription routing, a client module 110 is assigned to a published object based on a subscription for the published object received from the client module 110. For subscription routing, all distribution targets are open for user selection in client modules 110.

Referring to FIG. 9, the published object(s) having assigned target systems are distributed to the assigned target system(s). (Step 930)

Figure 11:
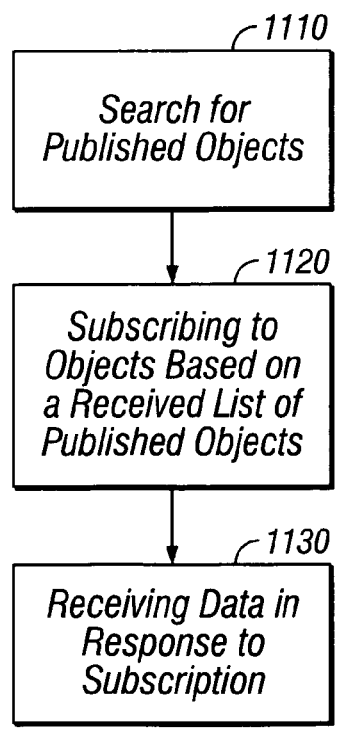
FIG. 11 is a flow diagram illustrating an implementation of a method for receiving distributed in a collaborative master data management system.
Figure 12:
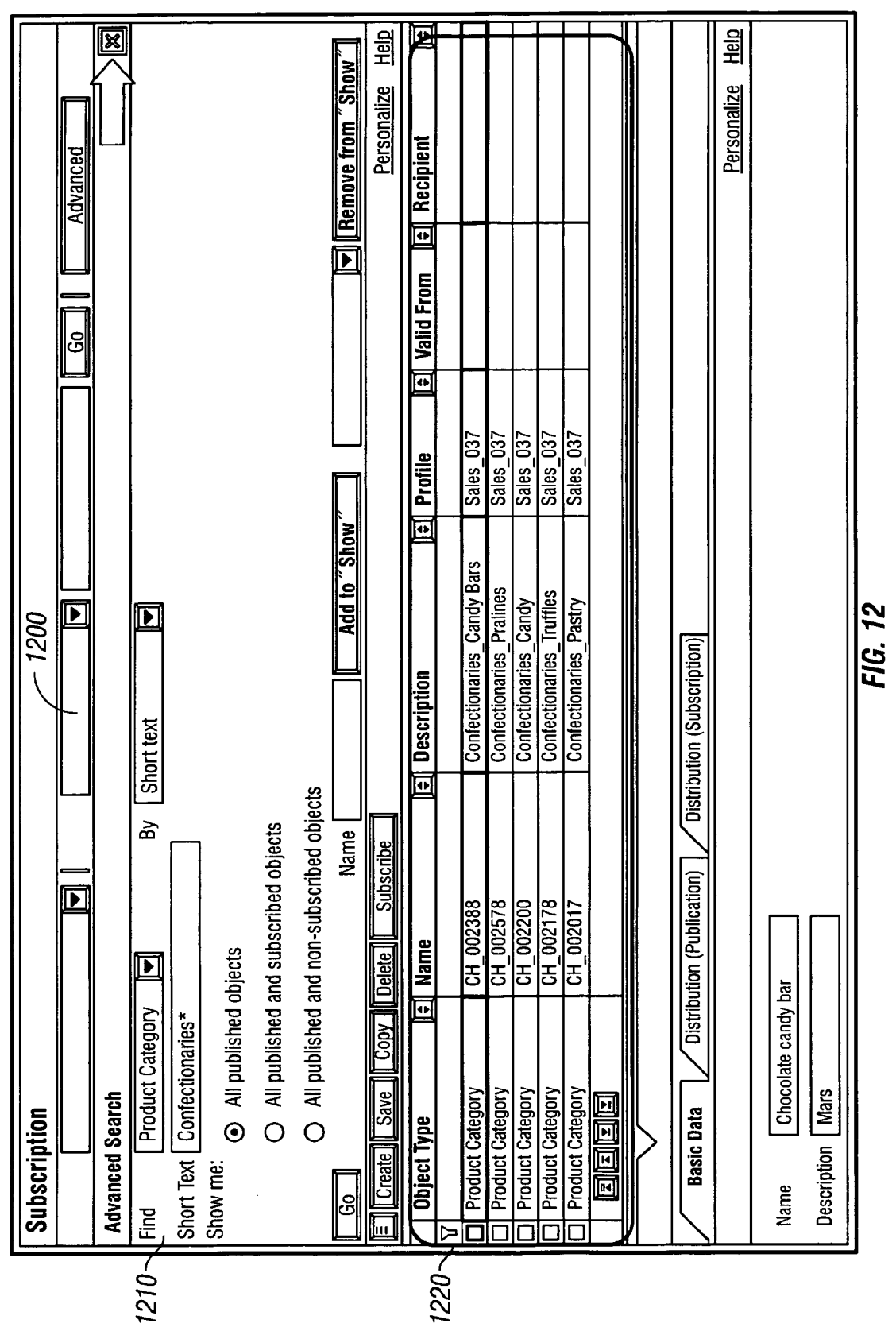

FIG. 11 is a flow diagram illustrating an implementation of a method for receiving distributed master data objects in a cMDM system. Referring to FIGS. 1A, 1B and 11, a user at a client module searches for published objects stored in a central system. (Step 1110) Referring to FIG. 12, the user can search for the published objects through a UI 1200.

The user can enter a search through search section 1210 of UI 1200. The user can specify an object type and a description of the objects for which the user is searching. The user can also specify if the user would like the search results to include all published objects, all published objects and subscribed objects or all published and non-subscribed objects. A user can subscribe to a non-published master data object if the user has authorization to subscribe to the non-published master data object.

The user can subscribe to one or more published objects from a list of published objects in section 1220 of UI 1200. (Step 1120) The list of published objects can be presented to the user by central module 100 in response to the search. The user can select a plurality of objects to which to subscribe. The user also specifies a profile for the object. For example, the user can enter a date at which the client system wants the distribution to start. The user can also specify a type of recipient system. For example, the user can specify that the master data object should go to a specific system, such as, "System ABC". In another example, the user can specify that the target client system is a historic target, rule-based target or an organizational unit target.

The client module 110 then receives data from the central module 100 in response to the subscription. (Step 1130)

The distribution feature of cMDM can also include a reporting capability. The central module 100 can support the generation of reports regarding object publishing information, object subscription information and distribution related information. For example, the central module 100 can enable the generation of reports regarding which objects are not yet published, which objects are already published and/or which profiles were used for which objects. The central module 100 can also enable the generation of reports regarding for which objects a client module 110 is subscribed, which client module(s) 110 are subscribed for which object, and/or which objects do not have subscriptions. Distribution related reports can include reports regarding the last distribution of an object or objects and/or local replicates of an object. The central module 100 can generate the reports using the mapping information for the master data objects.

The central module 100 can generate reports regarding performance monitoring of the distribution process. For example, the central module 100 generate a report listing what errors occurred, where the errors occurred and/or why the error occurred. The report can also include a link to the error location for review and problem resolution.

The central module 100 can further generate reports regarding staging. For example, the central module 100 can generate a report regarding what objects are identical or which objects have errors.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A method of distributing data in a data management system, comprising:
   identifying one or more objects in a central data store for distribution, the one or more objects including master data objects for use by client systems in the data management system;
   determining if a routing exists for at least one object of the one or more objects, the routing including information for sending the at least one object to locations in a network that includes one or more target systems, the one or more target systems being part of the data management system;
   receiving information from the one or more target systems for the at least one object, the information including one or more of subscription information, distribution start information, distribution frequency information, and recipient type information, the recipient type information including a historic recipient, a rule-based recipient, or an organizational unit recipient;
   storing the information in a distribution list that identifies the one or more target systems to receive data related to the at least one object, the distribution list being stored in the central data store;
   assigning a distribution profile to the at least one object and storing the distribution profile in the central data store, the distribution profile including criteria that specify a portion of data related to the at least one object for distribution to the one or more target systems by evaluating an authorization of the one or more target systems to receive the portion of data related to the at least one object;
   determining the portion of data related to the at least one object for distribution to the one or more target systems based on the distribution list and a distribution profile; and
   distributing the at least one object to the one or more target systems based on the distribution list and the distribution profile by sending the portion of data related to the at least one object to the one or more target systems.

2. The method of claim 1, wherein distributing the at least one object includes distributing the at least one object immediately.

3. The method of claim 1, wherein distributing the at least one object includes distributing the at least one object periodically.

4. The method of claim 1, wherein identifying one or more objects includes identifying one or more packets of objects, and wherein distributing the at least one object includes distributing the one or more packets of objects.

5. The method of claim 4, wherein the one or more packets of objects are distributed immediately.

6. The method of claim 4, wherein the one or more packets of objects are distributed periodically.

7. The method of claim 1, further comprising:
   determining which parts of the at least one object can be distributed.

8. The method of claim 1, further comprising:
   receiving information from the one or more target systems indicating which objects are requested by the one or more target systems, wherein determining the one or more target systems to which to distribute the at least one object is based on subscription information received from the one or more target systems.

9. The method of claim 1, further comprising:
   receiving frequency information from the one or more target systems indicating how often to distribute the at least one object to the one or more target systems, wherein distributing the at least one object includes distributing the at least one object at a frequency indicated by the received frequency information.

10. The method of claim 1, further comprising:
    receiving distribution date information from the one or more target systems indicating from which date to distribute the at least one object to the one or more target systems, wherein distributing the at least one object includes distributing the at least one object from a data indicated by the received distribution date information.

11. The method of claim 1, further comprising:
    receiving user input specifying one or more target systems to which to supply at least one object, wherein determining the one or more target systems to which to distribute at least one object includes determining the one or more target systems in response to the user input.

12. The method of claim 1, further comprising:
storing identification of the one or more target systems to which to distribute the at least one object in the distribution profile for the at least one object.

13. The method of claim 1, further comprising:
publishing one or more identified objects, one or more resulting published objects being available for subscription by a client system.

14. The method of claim 13, further comprising:
generating a report.

15. The method of claim 14, wherein the report comprises information regarding at least one of published objects, subscriptions and distribution of objects.

16. The method of claim 14, wherein the report comprises information regarding one of a last distribution of an object and local replicates of an object.

17. The method of claim 14, wherein the report comprises a process monitoring report.

18. The method of claim 14, wherein the report comprises a staging report.

19. The method of claim 1, wherein the criteria identify one or more objects associated with a manufactured product including criteria for at least one of materials for the manufactured product, structures corresponding to the manufactured product, and documents describing the manufactured product.

20. The method of claim 1, further comprising consolidating content for the one or more objects by identifying and removing inconsistent references for equivalent data content, wherein consolidating the content includes replacing occurrences from a plurality of alternative references for an identified data content with a consistent reference for the identified data content.

21. The method of claim 1, further comprising harmonizing master data for the one or more objects by matching two objects as sufficiently similar and mapping one of the two objects to another of the two objects, wherein matching the two objects as sufficiently similar includes determining a sufficient overlap in a plurality of attributes that characterize data values for the two items.

22. The method of claim 1, further comprising centrally managing master data for the one or more objects by:
receiving values for a requested master data object from a client system;
identifying an existing master data object that corresponds to the requested master data object by identifying attributes that characterize data values of the existing master data object and determining that the values received from the client system correspond to the identified attributes; and
notifying the client system that the existing master data object corresponds to the requested master data object.

23. The method of claim 1, further comprising:
making a change in the at least one object in the central data store after distributing the portion of the at least one object to the one or more target systems; and
in response to making the change in the at least one object in the central data store, distributing a correspondingly changed portion of the at least one object to the one or more target systems based on the distribution list and the distribution profile.

24. The method of claim 1, wherein the information received from the one or more target systems identifies one or more operations of a first target system, and the method further comprises:

accessing a rule that relates the one or more operations of the first target system to the at least one object based on the content of the at least one object so that the first target system is included in the distribution list that identifies the one or more target systems to receive data related to the at least one object.

25. The method of claim 1, wherein the information received from the one or more target systems includes a request for distributing the at least one object and an assignment of the distribution profile for the at least one object.

26. A method for receiving dynamic access data comprising:
searching, from a client system, for available objects stored in a central system, the available objects including published objects and objects to which the client system is authorized to subscribe;
subscribing, from the client system, to at least one object from a list of the available objects, the at least one object being associated with a subscription;
transmitting, from the client system, information for the at least one object to the central system, the information including one or more of subscription information, distribution start information, distribution frequency information, and recipient type information, the recipient type information including a historic recipient, a rule-based recipient, or an organizational unit recipient, the information being stored in a distribution list in a central data store; and
receiving data from the central system at the client system in response to the subscription, wherein the data is received based on the distribution list and a distribution profile assigned to the at least one object and stored for the at least one object in the central data store, the distribution profile including criteria that specify a portion of data contained in the at least one object for distribution by evaluating an authorization of the client system to receive the portion of data, the data received from the central system including the portion of data specified by the distribution profile.

27. The method of claim 26, further comprising:
defining a distribution frequency for receiving the data from the central system.

28. The method of claim 26, further comprising:
defining a distribution start date for distributing the data to the client system.

29. The method of claim 26, wherein subscribing to the at least one object includes selecting the distribution profile from the list of available objects.

30. A system for sharing data comprising:
one or more client systems; and
a central module of an entity including a central data store to store data objects for the entity, the data objects for use by the one or more client systems, the central module including one or more processors configured to select portions of the data objects to distribute to the one or more client systems and to distribute the portions of the data objects to the one or more client systems based on a distribution list stored in the central data store, the distribution list including information received from the one or more client systems, the information including one or more subscriptions to data objects, historic subscriptions to data objects and rule-based routings, the rule-based routings including information for sending the portions of the data objects to locations in a network, the central module being further configured to distribute the portions of the data objects to the one or more client systems based on the distribution list and one or more distribution profiles assigned to at least one data object of the data objects and stored for the at least one data object, the one or more distribution profiles including criteria that specify portions of data contained in the data objects to be distributed to the one or more client systems by evaluating an authorization of the one or more client systems to receive the portions of data.

31. The system of claim 30, wherein the central module is further configured to generate a report regarding distribution of portions of the data objects to the one or more client systems.

32. The system of claim 31, wherein the report includes one or more of a publishing related report, a process monitoring report and a staging report.

33. A non-transitory computer-readable medium comprising instructions operable to cause a programmable processor to:
  identify one or more objects in a central data store for distribution, the one or more objects including master data objects for use by the client systems in a data management system;
  determine if a routing exists for at least one object of the one or more objects, the routing including information for sending the at least one object to locations in a network that includes one or more target systems, the one or more target systems being part of the data management system;
  receive information from the one or more target systems for the at least one object, the information including one or more of subscription information, distribution start information, distribution frequency information, and recipient type information, the recipient type information including a historic recipient, a rule-based recipient, or an organizational unit recipient, the information being stored in a distribution list in a central data store;
  store the information in a distribution list that identifies the one or more target systems to receive data related to the at least one object, the distribution list being stored in the central data store;
  assign a distribution profile to the at least one object and store the distribution profile in the central data store, the distribution profile including criteria that specify a portion of data related to the at least one object for distribution to the one or more target systems by evaluating an authorization of the one or more target systems to receive the portion of data related to the at least one object;
  determine the portion of data related to the at least one object for distribution to the one or more target systems based on the distribution list and a distribution profile; and
  distribute the at least one object to the one or more target systems based on the distribution list and the distribution profile by sending the portion of data related to the at least one object to the one or more target systems.

34. The computer-readable medium of claim 33, wherein the at least one object is distributed immediately.

35. The computer-readable medium of claim 33, wherein the at least one object is distributed periodically.

36. The computer-readable medium of claim 33, wherein the instructions operable to cause a programmable processor to identify one or more objects includes instructions operable to cause a programmable processor to identify one or more packets of objects, and wherein the instructions operable to cause a programmable processor to distribute the one or more packets of objects includes instructions operable to cause a programmable processor to distribute the one or more packets of objects.

37. The computer-readable medium of claim 36, wherein the one or more packets of objects are distributed immediately.

38. The computer-readable medium of claim 36, wherein one or more packets of objects are distributed periodically.

39. The computer-readable medium of claim 33, further comprising instructions operable to cause a programmable processor to:
  determine which parts of the at least one object can be distributed.

40. The computer-readable medium of claim 33, further comprising instructions operable to cause a programmable processor to:
  receive information from the one or more target systems indicating which objects are requested by the one or more target systems, wherein determining the one or more target systems to which to distribute at least one object is based on subscription information received from the one or more target systems.

41. The computer-readable medium of claim 33, further comprising instructions operable to cause a programmable processor to:
  receive frequency information from the one or more target systems indicating how often to distribute the at least one object to the one or more target systems, wherein distributing the at least one object includes distributing the at least one object at a frequency indicated by the received frequency information.

42. The computer-readable medium of claim 33, further comprising instructions operable to cause a programmable processor to:
  receive distribution date information from the one or more target systems indicating from which date to distribute the at least one object to the one or more target systems, wherein distributing the at least one object includes distributing the at least one object from a date indicated by the received distribution date information.

43. The computer-readable medium of claim 33, further comprising instructions operable to cause a programmable processor to:
  receive user input specifying one or more target systems to which to supply at least one object, wherein determining the one or more target systems to which to distribute the at least one object includes determining the one or more target systems in response to the user input.

44. The computer-readable medium of claim 33, further comprising instructions operable to cause a programmable processor to:
  store identification of the one or more target systems to which to distribute the at least one object in the distribution profile for the at least one object.

45. The computer-readable medium of claim 33, further comprising instructions operable to cause a programmable processor to:
  publishing one or more identified objects, one or more resulting published objects being available for subscription by a client system.

46. The computer-readable medium of claim 45, further comprising instructions operable to cause a programmable processor to:
  generate a report.

47. The computer-readable medium of claim 46, wherein the report comprises information regarding at least one of published objects, subscriptions and distribution of objects.

48. The computer-readable medium of claim 47, wherein the report comprises information regarding one of a last distribution of an object and local replicates of an object.

49. The computer-readable medium of claim 46 wherein the report comprises a process monitoring report.

50. The computer-readable medium of claim 46, wherein the report comprises a staging report.

51. A non-transitory computer-readable medium comprising instructions operable to cause a programmable processor to:
   search, from a client system, for available objects stored in a central system, the available objects including published objects and objects to which the client system is authorized to subscribe;
   subscribe, from the client system, to at least one object from a list of the available objects, the at least one object being associated with a subscription;
   transmit, from the client system, information for the at least one object to the central system, the information including one or more of subscription information, distribution start information, distribution frequency information, and recipient type information, the recipient type information including a historic recipient, a rule-based recipient, or an organizational unit recipient, the information being stored in a distribution list in a central data store; and
   receive data from the central system at the client system in response to the subscription, wherein the data is received based on the distribution list and a distribution profile assigned to the at least one object and stored for the at least one object in the central data store, the distribution profile including criteria that specify a portion of data contained in the at least one object for distribution by evaluating an authorization of the client system to receive the portion of data, the data received from the central system including the portion of data specified by the distribution profile.

52. The computer-readable medium of claim 51, further comprising instructions operable to cause a programmable processor to:
   define a distribution frequency for receiving the data from the central system.

53. The computer-readable medium of claim 51, further comprising instructions operable to cause a programmable processor to:
   define a distribution start date for distributing the data to the client system.

54. The computer-readable medium of claim 51, wherein the instructions operable to cause a programmable processor to subscribe to one or more objects includes instructions operable to cause a programmable processor to select the distribution profile from the list of available objects.

* * * * *